United States Patent [19]

Strother

[11] 4,406,776
[45] Sep. 27, 1983

[54] FLUIDIZED CATALYTIC CRACKING PROCESS AND APPARATUS

[75] Inventor: Charles W. Strother, Arlington Heights, Ill.

[73] Assignee: UOP Inc., Des Plaines, Ill.

[21] Appl. No.: 411,215

[22] Filed: Aug. 25, 1982

[51] Int. Cl.³ .............................................. C10G 11/18
[52] U.S. Cl. ................................... 208/153; 208/161; 422/144; 422/213
[58] Field of Search ................ 208/153, 161; 422/144, 422/213, 214

[56] References Cited

U.S. PATENT DOCUMENTS

| | | | |
|---|---|---|---|
| 3,649,522 | 3/1972 | Martin | 208/120 |
| 3,957,443 | 5/1976 | Strickland et al. | 208/153 |
| 3,959,117 | 5/1976 | Bunn, Jr. et al. | 208/153 |
| 4,051,013 | 9/1977 | Strother | 208/78 |
| 4,194,965 | 3/1980 | Billings et al. | 208/113 |
| 4,206,174 | 6/1980 | Heffley et al. | 422/214 |
| 4,353,812 | 10/1982 | Lomas et al. | 422/144 |

OTHER PUBLICATIONS

The Oil and Gas Journ     1972, pp. 102-110, "FCC Getting Boost from All-Riser Cracking" by C. W. Strother et al.
The Oil and Gas Journal, Oct. 8, 1973, pp. 65-70, "Gains from FCC Revival Evident Now" by J. J. Blazek.

*Primary Examiner*—Delbert E. Gantz
*Assistant Examiner*—Lance Johnson
*Attorney, Agent, or Firm*—James R. Hoatson, Jr.; John F. Spears, Jr.; William H. Page, II

[57] ABSTRACT

A process and an apparatus for the fluidized catalytic cracking of hydrocarbons are disclosed. A small vent conduit extends upward out of the flow diversion device mounted on the top of the riser reactor. This vent conduit preferably carries between about 2 and 10 percent of the vapor and catalyst leaving the top of the riser upward into the upper portion of the receiving vessel. This reduces coke deposits in the upper portion of the vessel. The remainder of the vapors and catalyst are preferably directed downward upon leaving the top of the riser.

3 Claims, 1 Drawing Figure

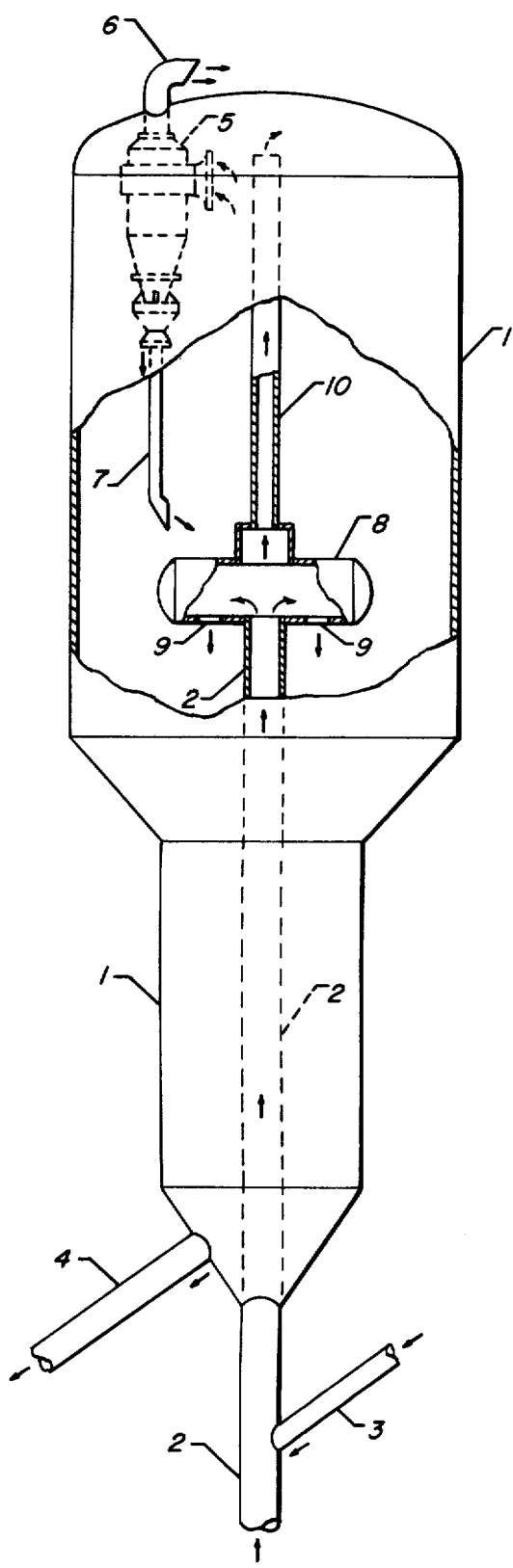

4,406,776

FLUIDIZED CATALYTIC CRACKING PROCESS AND APPARATUS

FIELD OF THE INVENTION

The invention relates to a new and useful hydrocarbon conversion process and to a unique reactor configuration for performing the process. The invention is directly related to the commonly employed petroleum refining process referred to in the art as a fluidized catalytic cracking (FCC) process. The invention is specifically related to the apparatus employed in an FCC process and to the suppression of coke deposits in the upper portion of the reaction vessel.

PRIOR ART

Fluidized catalytic cracking processes are in widespread commercial use in petroleum refineries to upgrade hydrocarbons. Those knowledgeable in the art are capable of designing and operating FCC processes. Evidence of this is provided by the several competing commercial designs shown in the articles at page 102 of the May 15, 1972 edition and at page 65 of the Oct. 8, 1973 edition of the Oil and Gas Journal. These articles are also pertinent for showing various commercial designs for the riser or reaction conduit. The design shown in FIG. 4 of the Oct. 8 article is believed to be the most pertinent. It is also believed that this design is similar to that shown in U.S. Pat. No. 3,649,522. In this design the riser empties into a cyclone having a vertical vapor outlet. A similar design is shown in U.S. Pat. Nos. 4,051,013 and 4,194,965 in which the reaction stream passes horizontally out of a vertical riser reactor into cyclone separators. As also shown by these references the vapors separated from the reaction stream leaving the reactor riser normally enter a cyclone located near the top of the receiving vessel to lessen the discharge of catalyst from the vessel with the effluent stream.

As the previously cited references indicate it is also known that the top of the riser may be open to allow the reaction stream to discharge upward into the reaction vessel. However, the trend of modern FCC units is to seek a quick separation of the catalyst and hydrocarbons to better control the results of the cracking reaction. A representative contemporary FCC reactor which does not employ a cyclone at the top of the reactor may therefore utilize a flow reversal means such as the chamber 8 of the attached diagrammatic sketch.

It is believed that heretofore the intentional discharge of a small unseparated portion of the catalyst-containing reaction stream into or above the volume of the receiving vessel containing the exit cyclone has not been disclosed.

BRIEF SUMMARY OF THE INVENTION

The process embodiment of the invention may be broadly characterized as a hydrocarbon conversion process useful in the fluidized catalytic cracking of hydrocarbons which comprises the steps of passing a reaction stream upward through a reaction conduit maintained at high temperature reaction conditions, with the reaction stream fluidizing and carrying catalyst particles upward through the reaction conduit; and separating the reaction stream into at least two portions at the approximate level of a flow diversion device, with a first portion comprising at least 80 percent of the vapors and catalyst entrained in the reaction stream being redirected in a downward direction into the internal volume of a reaction vessel, and with a second portion of the reaction stream comprising less than 15 percent of the vapors and catalyst entrained in the reaction stream continuing upward above the flow diversion device through a vertical vent conduit and discharging in an upward direction into the reaction vessel.

DESCRIPTION OF THE DRAWING

The enclosed diagrammatic sketch illustrates the preferred process and apparatus embodiments of the subject invention. In these embodiments, the invention is utilized in a fluidized catalytic cracking (FCC) process for the conversion of various petroleum fractions. Referring now to the sketch, a preheated feed stream comprising a gas oil fraction enters the bottom of the vertical conduit 2 which is the "riser reactor" or reaction zone of the FCC process. The rising feed stream fluidizes newly regenerated FCC catalyst descending through the catalyst transfer line 3. The resultant admixture of hydrocarbons and catalyst rises upward through the conduit 2 which is maintained at suitable cracking conditions to result in the conversion of the entering gas oil feed stream to a mixture of products having a lower molecular weight. A horizontal cylindrical chamber 8 is attached to the end of the reactor riser and receives the reaction stream leaving the top of the riser. The flow of the great majority of the vapors and catalyst leaving the top of the riser is redirected first horizontally and then downward through the openings 9 in the bottom of the chamber 8. The chamber 8 therefore functions as a flow diversion means which causes most of the reaction stream leaving the riser to emerge downward toward a dense phase of catalyst not shown which is retained within the lower portion of the vessel. This action speeds the separation of the cracking catalyst from the hydrocarbon vapors and thus terminates the cracking reaction at a desired point governed by the operating conditions maintained within the riser.

A very much smaller second portion of the unseparated reaction stream emanating from the top of the riser is allowed to pass upward through a vent conduit 10 into the upper portion of the outer vessel 1. Preferably this portion of the reaction stream comprises from about 2 to about 10 volume percent of the vapors and catalyst leaving the top of the riser and is discharged from the top of the vent conduit 10 at a point above the bottom of the inlet of the solids-vapor separation means employed within the apparatus. In the embodiment illustrated in the sketch, the solids-vapor separation device 5 is a cyclone-type device which receives all of the vapors released into the vessel together with any entrained catalyst. A highly effective solids-vapor separation device such as the cyclone removes most of the entrained catalyst to produce a stream of catalyst which is emptied from the separating device through a dipleg 7 and a product vapor stream which is removed from the apparatus through the conduit 6. The used catalyst accumulates as a dense phase bed maintained in the bottom of the vessel and is slowly withdrawn through the catalyst transfer line 4 and passed to a regeneration zone not shown to balance the inventory of catalyst within the vessel.

As illustrated in the sketch, the vent conduit 10 is preferably located directly above the riser 2 such that vapors and catalyst leaving the top of the riser may travel directly upward into the inlet of the vent conduit. This arrangement causes the discharge of the small undiverted portion of the reaction stream to discharge in an upward direction near the top of the vessel 1. The agitation caused by this vapor stream and the presence of the catalyst results in a uniform temperature on the inner surfaces at the top of the vessel and the top portions of the solids-vapor separation device. This has been found to be an effective means to prevent the accumulation of sizable amounts of carbonaceous materials referred to as coke on these surfaces. This highly simplified diagrammatic sketch is presented for the purpose of illustrating the invention and is not intended to preclude from the scope of the subject invention those other embodiments described herein or which are the result of the normal and expected modification of those embodiments. The Drawing has been simplified by the elimination of many minor items normally employed in FCC processes such as flow control valves, temperature or pressure monitoring apparatus, catalyst stripping gas inlet lines and alternative construction of such items as the flow diversion means and the solids-vapor separation device.

DETAILED DESCRIPTION

Fluidized catalytic cracking processes are in widespread commercial use in petroleum refineries. They are utilized to reduce the average molecular weight of various petroleum-derived feed streams to yield higher value products. The design of these processes has generally evolved to the use of a normally vertical conduit as the main reaction site, with the effluent of the conduit emptying into a large volume process vessel. One or more solids-vapor separation devices, almost invariably a cyclone, is normally located at the top of this vessel. A contemporary operating problem is the accumulation of sizable deposits of carbonaceous materials referred to as coke on the inner surface of the top of the vessel and on other internals such as the solids-vapor separation device. This can cause large temperature differentials between different locations on the wall of the vessel due to the insulating properties of the coke. These deposits may therefore result in unforeseen stresses on the upper wall of the vessel and may cause it to deform. For this and other reasons, those skilled in the art will appreciate the undesirability of large coke deposits in the upper regions of the vessel.

It is therefore an objective of the subject invention to provide a fluidized catalytic cracking process which is not subject to excessive coke deposits in the upper regions of the reaction stream receiving vessel. A further objective of the subject invention is to provide an apparatus for performing fluidized catalytic reactions such as the fluidized catalytic cracking of petroleum fractions. Another objective of the subject invention is to provide an improved process and apparatus for performing fluidized catalytic cracking of the type in which the effluent of the riser reactor is relatively quickly separated into a catalyst phase and a vapor phase of greatly reduced catalyst content compared to the effluent of the rise reactor.

An understanding of fluidized catalytic cracking processes is beneficial in providing a background for an understanding of the usefulness and operation of the subject apparatus. Most major petroleum refineries contain a process unit referred to as an FCC unit. The function of this unit is to break down high molecular weight hydrocarbons into smaller, lower molecular weight hydrocarbons. An FCC unit is therefore used to upgrade heavy hydrocarbons to light hydrocarbons having a higher economic value. The feed stream to the process will be described herein in terms of petroleum-derived materials but is not limited to these materials. Liquids derived from tar sands, oil shale or the liquifaction of coal may be charged to an FCC process. The typical feed to an FCC unit is a gas oil such as a light or a vacuum gas oil. Other petroleum-derived feed streams may comprise a naphtha boiling range mixture of hydrocarbons or heavier hydrocarbons such as reduced crude oils. It is preferred that the feed stream comprises a mixture of hydrocarbons having boiling points, as determined by the appropriate ASTM test method, above about 350° F. and more preferably above 450° F.

An FCC unit comprises a reaction zone and a catalyst regeneration zone. In the reaction zone, the feed stream is contacted with a finely divided fluidized catalyst maintained at elevated temperatures and a moderate positive pressure. This causes the conversion of the feed stream to more volatile product hydrocarbons, which are recovered from a vaporous stream withdrawn from the reaction zone, and also causes the accumulation of carbonaceous deposits on the catalyst. These deposits lessen the catalytic effectiveness of the catalyst. To overcome this deactivation, a stream of used catalyst is continuously removed from the reaction zone and transferred into the catalyst regeneration zone of the FCC unit.

The stream of catalyst entering the regeneration zone joins a bed of fluidized catalyst retained within the regeneration zone and is contacted with pressurized air under a high temperature condition which results in the combustion of the carbonaceous deposits on the catalyst. This burning of the coke results in a reactivation or regeneration of the catalyst and also produces a very large amount of heat. The combustion products and the inert components of the oxygen supply stream charged to the regeneration zone are removed as a very high temperature gas stream referred to as the FCC flue gas stream. This stream may have a temperature of from about 1100° and 1400° F. and a pressure of about 15 and 60 psig, which is representative of typical conditions within the catalyst regeneration zone. The flue gas stream is normally removed through one or more cyclone-type particle separators located within the regeneration zone.

The reaction conduit is maintained at high temperature conditions which generally includes a temperature above about 800° F. (371° C.). Preferably the reaction conduit is maintained at cracking conditions which include a temperature of about 900° F. (482° C.) to about 1350° F. (734° C.) and a pressure of about 10 to about 200 psig but preferably less than 100 psig. The catalyst-to-oil ratio, based on the weight of catalyst and feed hydrocarbons entering the bottom of the riser may range up to 100:1 for some naphtha boiling range materials but is preferably between about 4:1 and about 25:1 on the basis of total hydrocarbon feed to the reactor. Hydrogen is not normally added to the riser although the use of hydrogen addition is described in recent publications. The average residence time of the catalyst in the riser is preferably less than approximately 10 seconds. The type of catalyst employed in the process may be chosen from a variety of commercially available catalysts. A catalyst comprising a zeolitic base material is preferred but the older style amorphous catalyst can be used if desired.

In the subject invention the reaction stream leaving the top of the riser reactor conduit is divided into a major first portion and a minor second portion. It is preferred that the second portion of the reaction stream is between about ten and about two volume percent of the total reaction stream emanating from the top of the riser. This second portion is to contain both the catalyst and vapors of the reaction stream. That is, the second portion is not a relatively catalyst-free vapor stream such as is discharged from the top of cyclone-type solids-vapor separation devices. Instead it preferably has a catalyst content substantially equal to that of the reaction stream leaving the riser but may differ somewhat due to minor unavoidable elutriation at the flow diversion means. One embodiment of the invention may accordingly be characterized as a fluidized catalytic cracking process which comprises the steps of passing a feed stream comprising hydrocarbonaceous compounds having boiling points above 350° F. upward through a reaction conduit while in contact with a particulate cracking catalyst at cracking conditions and thereby forming a reaction stream comprising hydrocarbon vapors and fluidized catalyst; directing a major first portion of the reaction stream in a direction other than upward through a flow diversion means located at the top of the reaction conduit; discharging a smaller second portion of the reaction stream upward into an upper portion of the internal volume of an enclosed reaction vessel above the flow diversion means through a vent conduit; withdrawing used catalyst from a lower portion of the reaction vessel; and withdrawing an effluent stream comprising hydrocarbonaceous compounds produced by catalytic cracking of compounds present in the feed stream from an upper portion of the reaction vessel.

The smaller second portion of the reaction stream provides turbulence which admixes the vapors present in the upper portion of the reaction vessel. This admixture, and the heat sink effect of any additional fluidized catalyst, causes all of the vapor in the upper portion of the vessel to be at approximately the same temperature. Localized high temperatures and stagnant vapor zones are thereby eliminated. This has been found to eliminate or at least greatly reduce coke build-up in the upper areas of the vessel, a problem which is more acute in vessels containing two or more separate cyclone separators and thus having more structural surfaces blocking vapor flow.

The flow diversion means located at the top of the riser may take many different forms. In its simplest form the flow diversion means may be a flat or cupped wall located a short distance above the upper open end of the riser. This wall or shroud is preferably in the form of a horizontal cylindrical chamber centrally mounted on the riser in the manner shown in the diagrammatic sketch. Another suitable form of the flow diversion chamber is shown in the previously cited U.S. Pat. No. 4,051,013 and comprises a horizontal cylinder extending from the side of the riser to a cyclone-type separator. The apparatus embodiment of the invention may be described as an apparatus for performing a chemical reaction which comprises an enclosed outer vessel; a reaction conduit extending upward from an external point into the outer vessel and terminating at an opening at an upper first end of the reaction conduit; a flow diversion means located at the opening at the first end of the reaction conduit, which means includes an imperforate shroud located above said opening in the reaction conduit and constructed to direct the majority of vapor and particles rising through the reaction conduit in a horizontal or downward direction; and a vertical vent conduit in communication with the reaction conduit and extending upward above said shroud, the vent conduit having an open upper end above the flow diversion means.

The vent conduit is preferably a straight vertical conduit mounted at the top center of the reactor riser. The vent conduit in commercial scale FCC units may be fabricated from 6 inch diameter or 10 inch diameter pipe and may be about 10 to 16 feet in height. The upper end of the vent conduit is preferably unobstructed and discharges the minor second portion of the reaction stream at an elevation at or above the inlet of the solids-vapor separation device. This stream should be discharged straight upward at a point which is not in front of the inlet of the solids-vapor separation device to limit the entrance of catalyst into the separation device. The stream formed by the second portion of the reaction stream should impinge on or sweep the upper surface of the outer reaction vessel to eliminate stagnant volumes in the uppper regions of the vessel. The following vapors will admix the contents of this region, and the entrained catalyst is a very effective heat sink which aids in providing a uniform temperature in this region.

The vent conduit is preferably attached to an opening in the flow diversion which is directly above the reactor riser. This presupposes a vertical riser or a riser having a vertical uppermost section. If the riser enters the reaction vessel at an incline the vent conduit is preferably aligned with the riser to directly receive a portion of the reaction stream. It is especially preferred that as shown in the diagrammatic sketch both the riser reactor and the vent conduit have a vertical central axis. These axes are preferably coincident but may be parallel and somewhat offset from each other. The apparatus embodiment of the invention may be described as an apparatus for performing a fluidized catalytic cracking process which comprises a vertically aligned outer vessel having a cylindrical upper internal volume; a reaction conduit extending vertically upward from an external point into the outer vessel and terminating at an open upper first end; a flow diversion means comprising a horizontally aligned cylindrical chamber attached to the first end of the reaction conduit, the chamber having a downward facing opening for vapor and catalyst egress; and a vertical vent conduit extending upward from the flow diversion means and communicating with the inner volume of the flow diversion means, the vent conduit having an open total cross-sectional area less than 15 percent of the total cross-sectional area of the openings for vapor and catalyst egress provided in the chamber of the flow diversion catalyst.

Those skilled in the art appreciate the highly erosive nature of the catalyst-containing reaction stream emanating from the top of the riser. Due care must be exercised in the design of flow diversion means and the entrance of the vent conduit to prevent excessive erosion. It is preferred that if feasible the vent conduit is mounted to a manway or other relatively large diameter chamber located on the top of the flow diversion means to provide a buffer zone which eliminates sharp corners directly in the path of the reaction stream. Such an arrangement is illustrated in the diagrammatic sketch of the invention.

I claim as my invention:
1. A fluidized catalytic cracking process which is performed within a reaction vessel to reduce coke de- posits within said vessel and which comprises the steps of:
- (a) passing a feed stream comprising hydrocarbonaceous compounds having boiling points above 350° F. upward through a riser reaction conduit in contact with a particulate cracking catalyst to form a reaction product stream of hydrocarbon vapors and fluidized catalyst particles;
- (b) passing said reaction product stream at the uppermost section of said riser reaction conduit to a flow diversion device to form at least two streams, each having substantially equal concentrations of fluidized catalyst therein;
- (c) passing a first stream obtained in the separation of the reaction product stream in a downward direction with respect to the direction of passage through said riser reaction conduit, wherein said first stream comprises at least 80 volume percent of the vapors and catalyst discharged from said riser reaction conduit;
- (d) passing a second stream obtained in the separation of the reaction product stream upward above said flow diversion device through a vertical vent conduit having axial alignment with said riser reactor conduit and discharging said second stream into the upper portion of said reaction vessel, wherein said second stream comprises from about 2 to about 10 volume percent of said vapors and catalyst discharged from said riser reactor conduit and which possesses a substantially equal concentration of fluidized catalyst as contained in the downward directed stream of step (c), whereby coke deposition on the interior of said upper portion of reactor vessel is reduced;
- (e) withdrawing used catalyst from a lower portion of the reaction vessel; and
- (f) withdrawing a reaction zone effluent stream comprising said hydrocarbon vapors formed in said catalytic cracking of said hydrocarbonaceous compounds in said feed stream from an upper locus of said reaction vessel.

2. The process of claim 1 further characterized in that the process comprises the fluidized catalytic cracking of hydrocarbonaceous compounds having boiling points above 450° F.

3. The process of claim 1 further characterized in that the effluent stream is withdrawn from the internal volume of the reaction vessel through a solids-vapor separation device having an inlet located above the flow diversion means.

* * * * *